Oct. 24, 1933.  J. KOPELIOWITSCH  1,931,961
HIGH TENSION GENERATOR
Filed Aug. 13, 1931
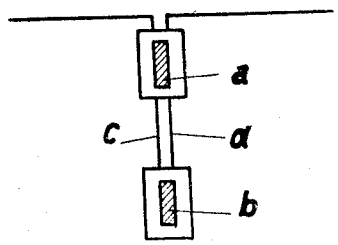
Inventor:
Jakob Kopeliowitsch,
by Byrnes, Townsend & Potter,
Attorneys.

Patented Oct. 24, 1933

1,931,961

UNITED STATES PATENT OFFICE 1,931,961

HIGH TENSION GENERATOR

Jakob Kopeliowitsch, Baden, Switzerland

Application August 13, 1931, Serial No. 556,839, and in Germany August 25, 1930

4 Claims. (Cl. 171—206)

In high tension power networks double-wound generators have latterly been used, which are arranged such that each half of the generator winding is connected to one network. The networks can in this way be coupled through the generators, the short-circuit kva. of the separate networks being reduced. In order to separate as far as possible the separate networks from one another it is of advantage to increase as far as possible the leakage flux between the separate windings of the double-wound generator. For this purpose the windings have hitherto been embedded in separate slots which are arranged singly or in groups alternately around the periphery of the stator. These arrangements, however, have the disadvantage that when the machine is asymmetrically loaded magnetic asymmetries occur. When the two windings are placed in a common slot of rectangular cross-section there is an insufficient inductive separation between the two windings.

According to this invention these disadvantages are overcome by the slot containing the two windings being provided with projections on the iron, which reduce the cross-sectional area of the slot.

In the accompanying drawing a constructional example of the invention is shown diagrammatically as applied to a double-wound generator. The slot for receiving the two windings $a$ and $b$ is stamped out in the stator iron in such a manner that it has projections $c$, $d$ between the windings which reduce the cross-sectional area of the slot. Through the projections $c$, $d$ an interlinking of the stray fields of the two windings is diminished.

The invention claimed is:

1. In a multiple wound dynamo-electric machine, a slotted magnetic member, a plurality of winding systems comprising coils in the slots of said magnetic member, the sides of coils of two different winding systems being located in each slot and at different depths therein, and magnetic means disposed in at least a portion of the space between the coil sides of each slot to provide a relatively high leakage flux between the said coil sides.

2. The invention as set forth in claim 1, wherein said means includes a projection formed on said slot wall and interposed between said coil sides.

3. In a double wound dynamo-electric machine, a slotted magnetic member having projections formed on the side walls of each slot to divide the slot into two portions, and coil sides of the two windings disposed respectively in said portions of the slot.

4. In a double wound dynamo-electric machine having its windings separately insulated, a magnetic member having a plurality of slots having substantially flat side walls, at least one wall of each slot having a lateral projection extending from the central portion thereof, and a coil side disposed in each slot on both sides of said projection, the coil on the two sides of said projection being connected in different windings.

JAKOB KOPELIOWITSCH.